US011544082B2

(12) United States Patent
Tai

(10) Patent No.: US 11,544,082 B2
(45) Date of Patent: Jan. 3, 2023

(54) SHARED VARIABLE BINDING AND PARALLEL EXECUTION OF A PROCESS AND ROBOT WORKFLOW ACTIVITIES FOR ROBOTIC PROCESS AUTOMATION

(71) Applicant: UiPath, Inc., New York, NY (US)

(72) Inventor: Alison Tai, Seattle, WA (US)

(73) Assignee: UiPath, Inc., New York, NY (US)

( * ) Notice: Subject to any disclaimer, the term of this patent is extended or adjusted under 35 U.S.C. 154(b) by 357 days.

(21) Appl. No.: 16/896,534

(22) Filed: Jun. 9, 2020

(65) Prior Publication Data

US 2021/0379764 A1 Dec. 9, 2021

(51) Int. Cl.
*G06F 9/451* (2018.01)
*B25J 9/16* (2006.01)

(52) U.S. Cl.
CPC ............ *G06F 9/451* (2018.02); *B25J 9/1689* (2013.01)

(58) Field of Classification Search
None
See application file for complete search history.

(56) References Cited

U.S. PATENT DOCUMENTS

| | | | |
|---|---|---|---|
| 6,721,748 B1 | 4/2004 | Knight et al. | |
| 7,343,551 B1 * | 3/2008 | Bourdev | G06F 40/30 715/224 |
| 7,519,969 B2 | 4/2009 | Bent et al. | |
| 8,214,362 B1 * | 7/2012 | Djabarov | G06F 40/174 715/224 |
| 8,799,857 B2 | 8/2014 | Szyperski et al. | |
| 10,198,698 B2 | 2/2019 | Jayaraman | |
| 10,614,516 B2 | 4/2020 | Jones | |
| 2013/0091444 A1 | 4/2013 | Halleux et al. | |
| 2017/0060366 A1 * | 3/2017 | Alexander | G06F 16/3325 |
| 2019/0213242 A1 * | 7/2019 | Pathak | G06F 40/174 |

FOREIGN PATENT DOCUMENTS

CN 110795071 A 2/2020

OTHER PUBLICATIONS

Nice RPA brochure available at https://www.nice.com/rpa/assets/NICE_Advanced_Process_Automation-Brochure_2018.pdf (last accessed Jun. 15, 2020).
Nice RPA chatbot page available at https://www.nice.com/engage/blog/chatbots—robotic-automation—a-match-made-in-heaven-2315/ (last accessed Jun. 15, 2020).
Nice RPA page available at https://www.nice.com/rpa/robotic-automation/ (last accessed Jun. 15, 2020).

* cited by examiner

*Primary Examiner* — Syed A Roni
(74) *Attorney, Agent, or Firm* — LeonardPatel PC; Michael A. Leonard, II; Sheetal S. Patel

(57) ABSTRACT

Shared variable binding and parallel execution of a process and robot workflow activities for robotic process automation (RPA) are disclosed. An RPA robot may be "bound" to a variable that is accessed by and displayed in an application. When the RPA robot is triggered, the RPA robot performs potentially conditional logic that may result in modifications to one or more bound variables. The RPA robot may lookup data, perform calculations, check on the status of other processes, and/or perform any other logical operations. The RPA robot may then modify, delete, or otherwise change the value of one or more bound variables, causing the application associated with those variables to display the results (e.g., when the user interface (UI) of the application is refreshed).

20 Claims, 18 Drawing Sheets

FIG. 7C

Welcome Email

Employee Look Up

Name
Greg Glover

Employee Information

Full Name
Greg Glover

Role
Software Engineer

Email
greg.glover@uipath.com

Start Date
April 27, 2020

Manager
Palak Kadakia

Email

Subject
Welcome to UiPath!

Personalized Introduction
Welcome to UiPath! We're so excited to have you here, Greg!

Personalized Introduction
Welcome to the team!

Personalized Introduction
Welcome to the team!

Training
☐ Company Welcome
☐ Business Standards of Conduct
☐ Get to Know Your Benefits

700

SHARED VARIABLE BINDING AND PARALLEL EXECUTION OF A PROCESS AND ROBOT WORKFLOW ACTIVITIES FOR ROBOTIC PROCESS AUTOMATION

FIELD

The present invention generally relates to robotic process automation (RPA), and more specifically, to shared variable binding and parallel execution of a process and robot workflow activities for RPA.

BACKGROUND

Conventionally, users wait for RPA robots to complete their workflows in attended automation. However, this reduces productivity since the user sits idle while the robot is interacting with the user's computing system. Accordingly, an improved approach to RPA may be beneficial.

SUMMARY

Certain embodiments of the present invention may provide solutions to the problems and needs in the art that have not yet been fully identified, appreciated, or solved by current RPA technologies. For example, some embodiments of the present invention pertain to shared variable binding and parallel execution of a process and robot workflow activities for RPA.

In an embodiment, a computer program for performing shared variable binding and parallel execution of a process and robot workflow activities for RPA is embodied on a non-transitory computer-readable medium. The computer program is configured to cause at least one processor to execute an RPA robot that is configured to access and modify one or more bound variables associated with one or more user interface (UI) elements of an application in parallel with the application. The one or more bound variables are located in memory. The program is also configured to cause the at least one processor to execute logic of a workflow of the RPA robot and modify at least one of the one or more bound variables in the memory based on the executed logic, thereby updating values displayed in the one or more UI elements of the application.

In another embodiment, a computer-implemented method for performing shared variable binding and parallel execution of a process and robot workflow activities for RPA includes executing, by a computing system, an RPA robot that is configured to access and modify one or more bound variables associated with one or more UI elements of an application in parallel with the application, the one or more bound variables located in memory. When a trigger is received or after a period of time since a last refresh elapses, the computer-implemented method includes executing logic of a workflow of the RPA robot, by the computing system, when the executed logic indicates that one or more variable updates should occur, modifying at least one of the one or more bound variables in the memory based on the executed logic, by the computing system, and refreshing a UI of the application after the RPA robot modifies the one or more bound variables, by the computing system.

In yet another embodiment, a computer-implemented method for performing shared variable binding and parallel execution of a process and robot workflow activities for RPA includes executing, by a computing system, an RPA robot that is configured to access and modify one or more bound variables associated with one or more UI elements of an application in parallel with the application. The one or more bound variables are located in memory. The computer-implemented method also includes binding, by the computing system, the one or more bound variables in one or more activities of the workflow of the RPA robot, thereby enabling the RPA robot to locate the bound variables in memory. When a trigger is received or after a period of time since a last refresh elapses, the computer-implemented method includes executing logic of a workflow of the RPA robot, by the computing system, and when the executed logic indicates that one or more variable updates should occur, modifying at least one of the one or more bound variables in the memory based on the executed logic, by the computing system. The binding of the one or more variables in the one or more activities of the workflow of the RPA robot includes configuring the RPA robot with respective pointers to the bound variables in memory, calling an application programming interface (API) of the application, by the RPA robot, that provides memory information for the one or more bound variables, or a combination thereof.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A-C are partial screenshots illustrating an onboarding email form, according to an embodiment of the present invention.

Unless otherwise indicated, similar reference characters denote corresponding features consistently throughout the attached drawings.

DETAILED DESCRIPTION OF THE EMBODIMENTS

Some embodiments pertain to shared variable binding and parallel execution of a process and robot workflow activities for RPA. An application (e.g., a form application) may be "bound" to a variable, and the variable may be "bound" to an RPA robot. The variable may be accessed by and displayed in an application (e.g., a form application, a web page, a spreadsheet, an email application, etc.). As used herein, "binding" of a variable means that the RPA robot is configured to identify the location of a variable in memory that is used by an application. This may be accomplished by configuring the RPA robot with a pointer to the variable in memory, the RPA robot calling an application programming interface (API) that provides memory information for variables for its displayed fields, and/or any other suitable mechanism(s) without deviating from the scope of the invention.

For instance, an RPA robot may launch an application if a suitably configured activity exists in its workflow or be launched to run in parallel with an already running application. In certain embodiments, the RPA robot may be launched and/or begin modifying bound variables based on a trigger. Some triggers may include, but are not limited to, a button being pressed in an application, an interrupt being generated, a command being received, a menu option being selected, an application or process launching, or any other suitable trigger without deviating from the scope of the invention.

In some embodiments, when the RPA robot is triggered, the RPA robot performs potentially conditional logic that may result in modifications to one or more bound variables. The RPA robot may lookup data, perform calculations, check on the status of other processes, and/or perform any other logical operations without deviating from the scope of the invention. The RPA robot may then modify, delete, or otherwise change the value of one or more bound variables, causing the application associated with those variables to display the results (e.g., when the user interface (UI) of the application is refreshed).

Figure 1:
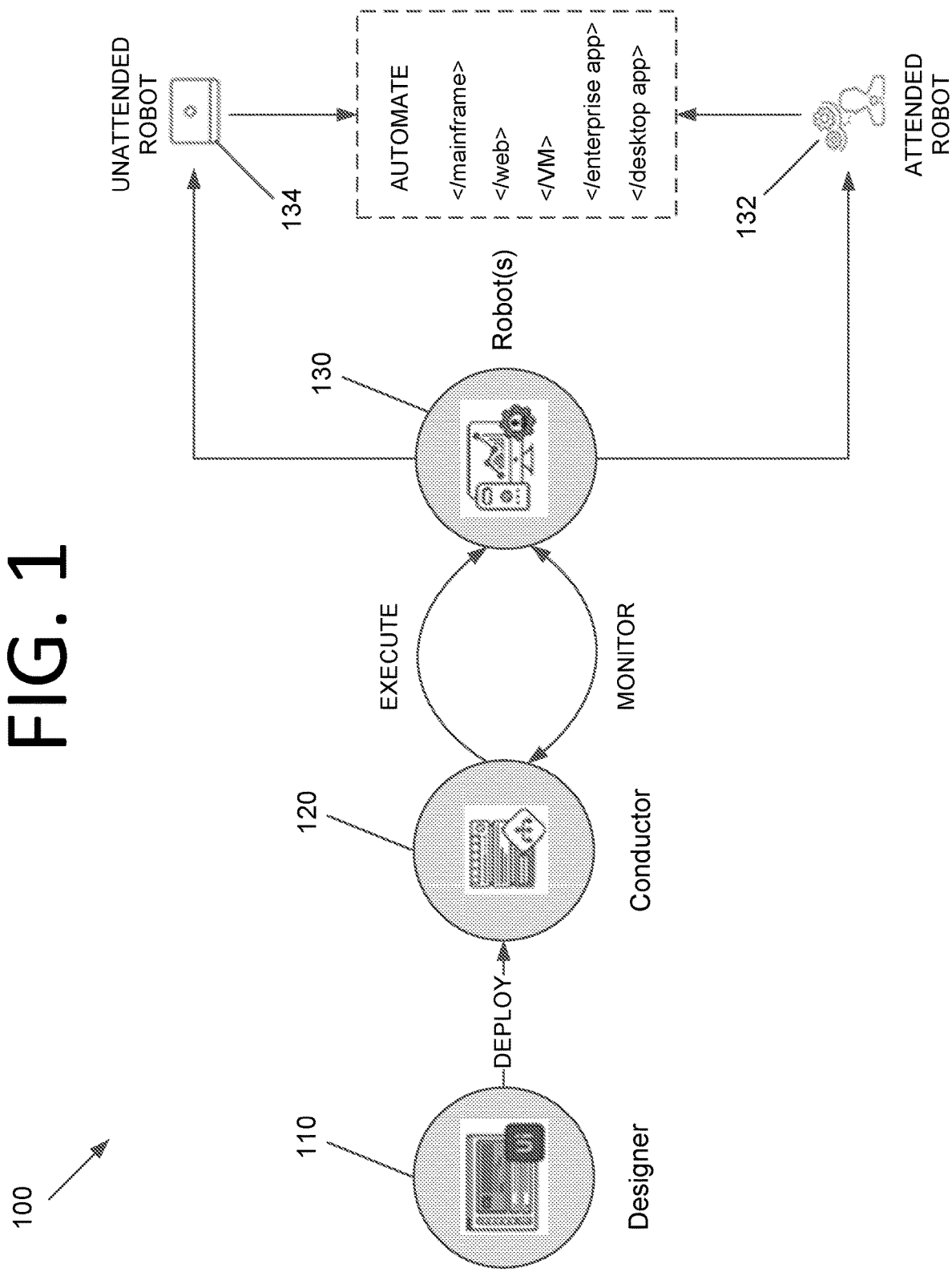
FIG. 1 is an architectural diagram illustrating a robotic process automation (RPA) system, according to an embodiment of the present invention.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
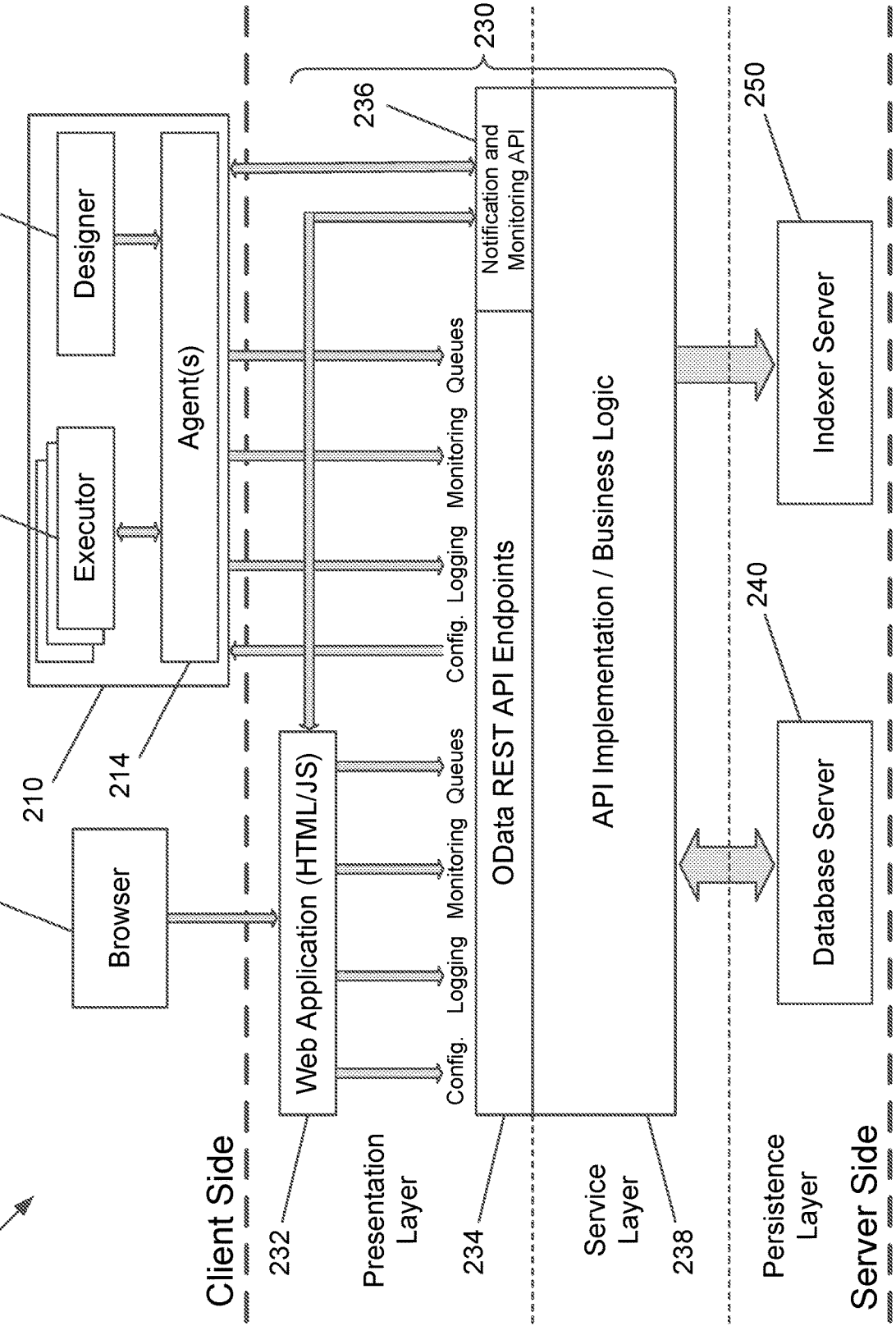
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
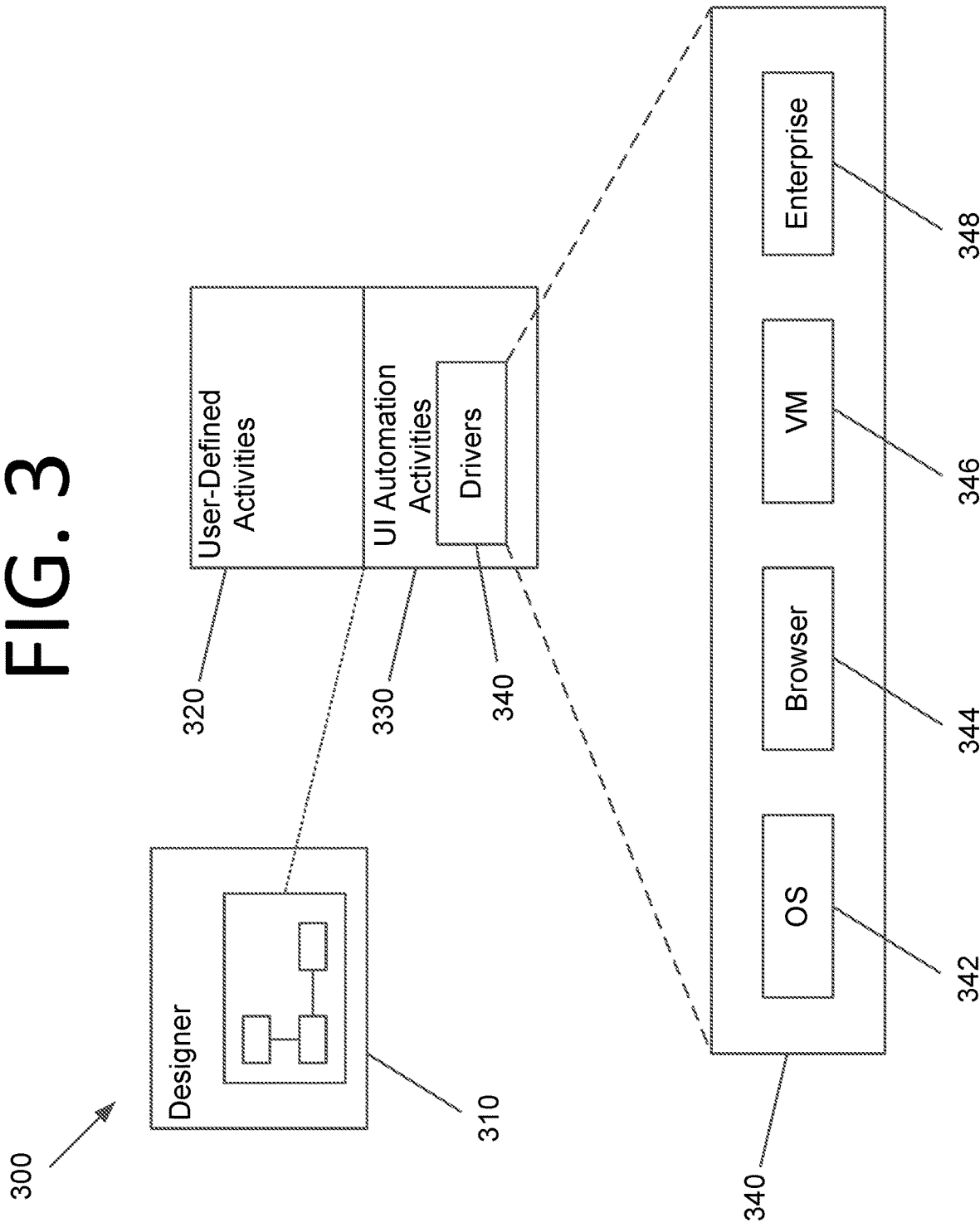
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
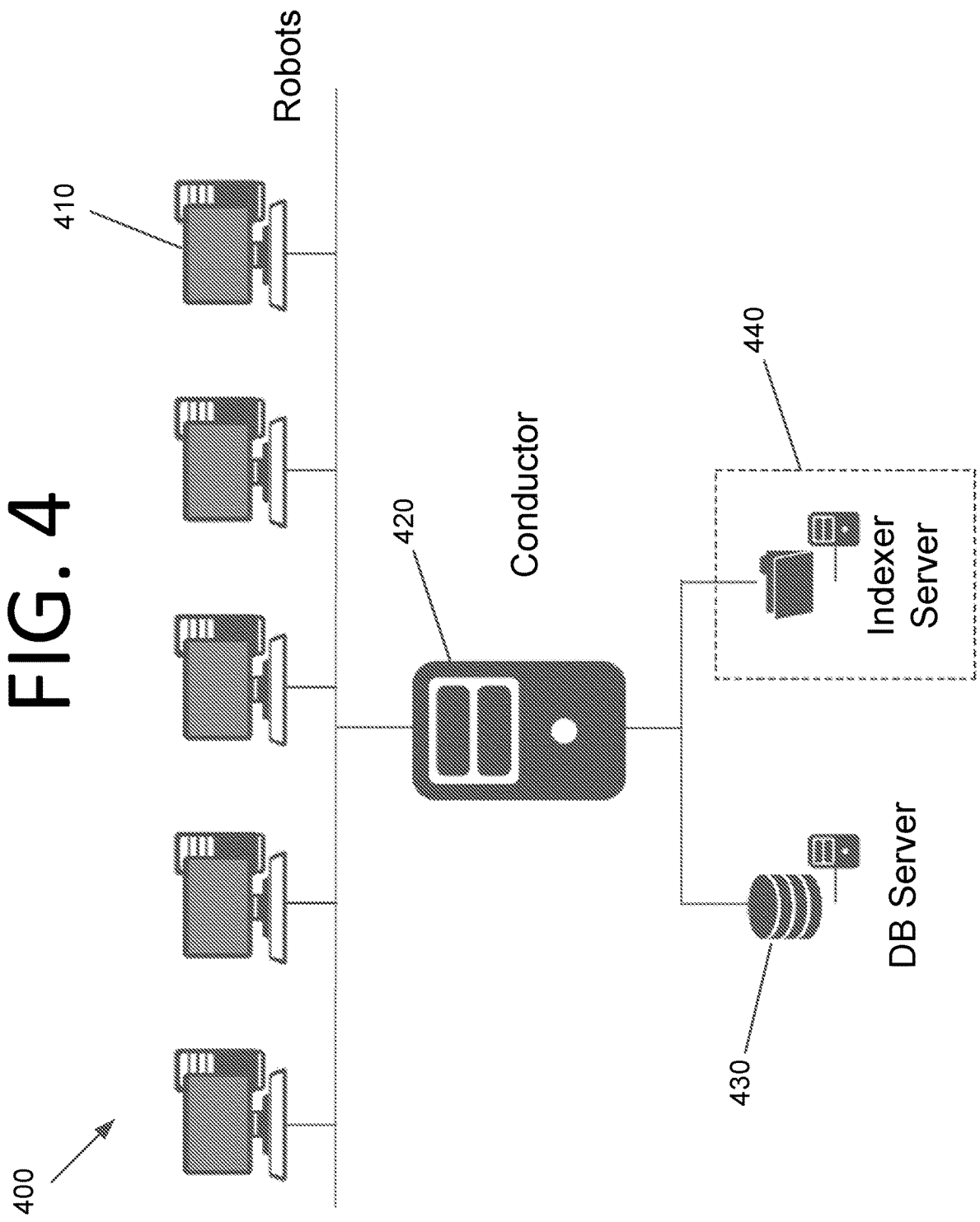
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
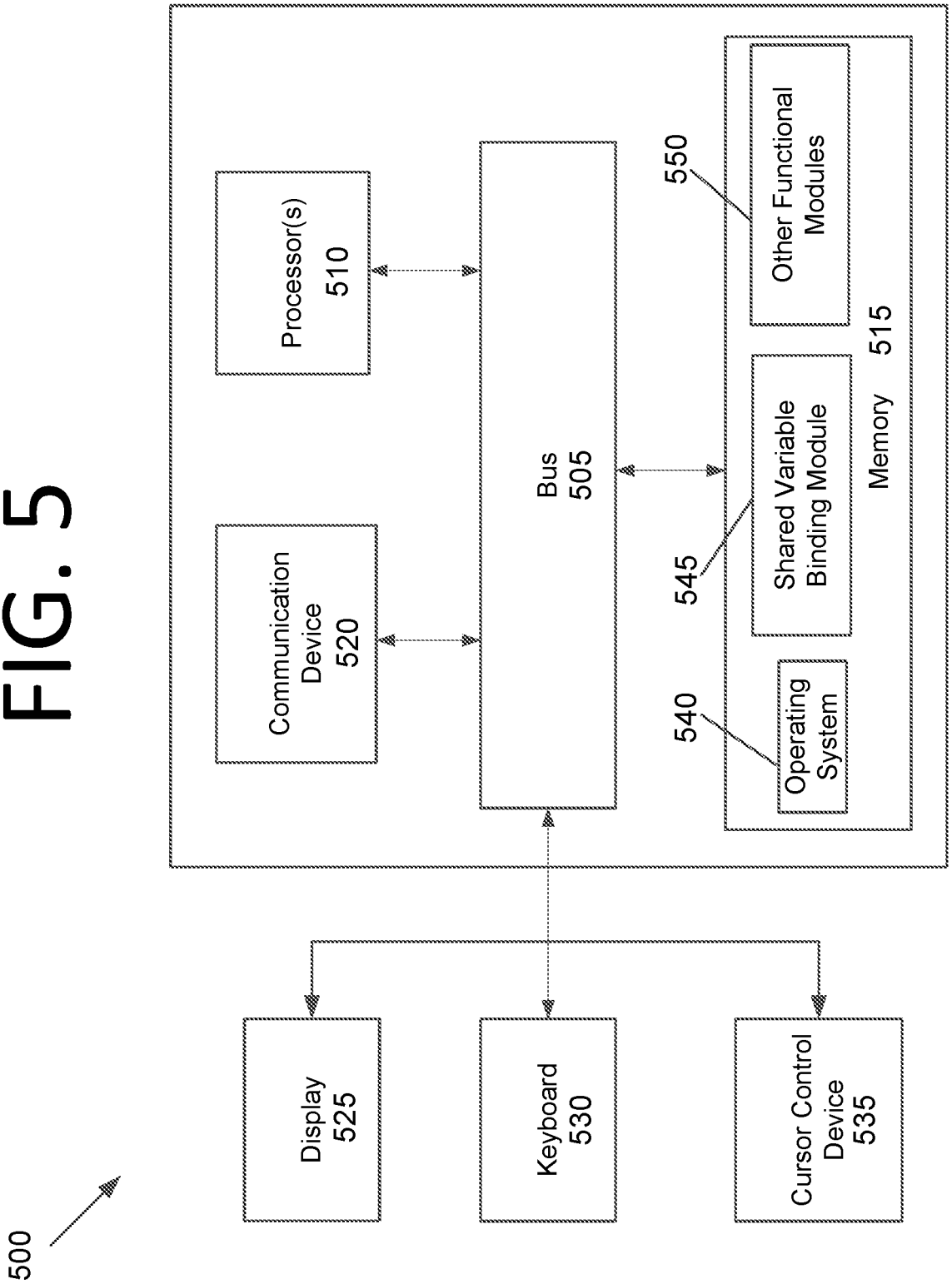
FIG. 5 is an architectural diagram illustrating a computing system configured to perform shared variable binding and parallel execution of a process and robot workflow activities for RPA, according to an embodiment of the present invention.

FIG. 5 is an architectural diagram illustrating a computing system 500 configured to perform shared variable binding and parallel execution of a process and robot workflow activities for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a shared variable binding module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
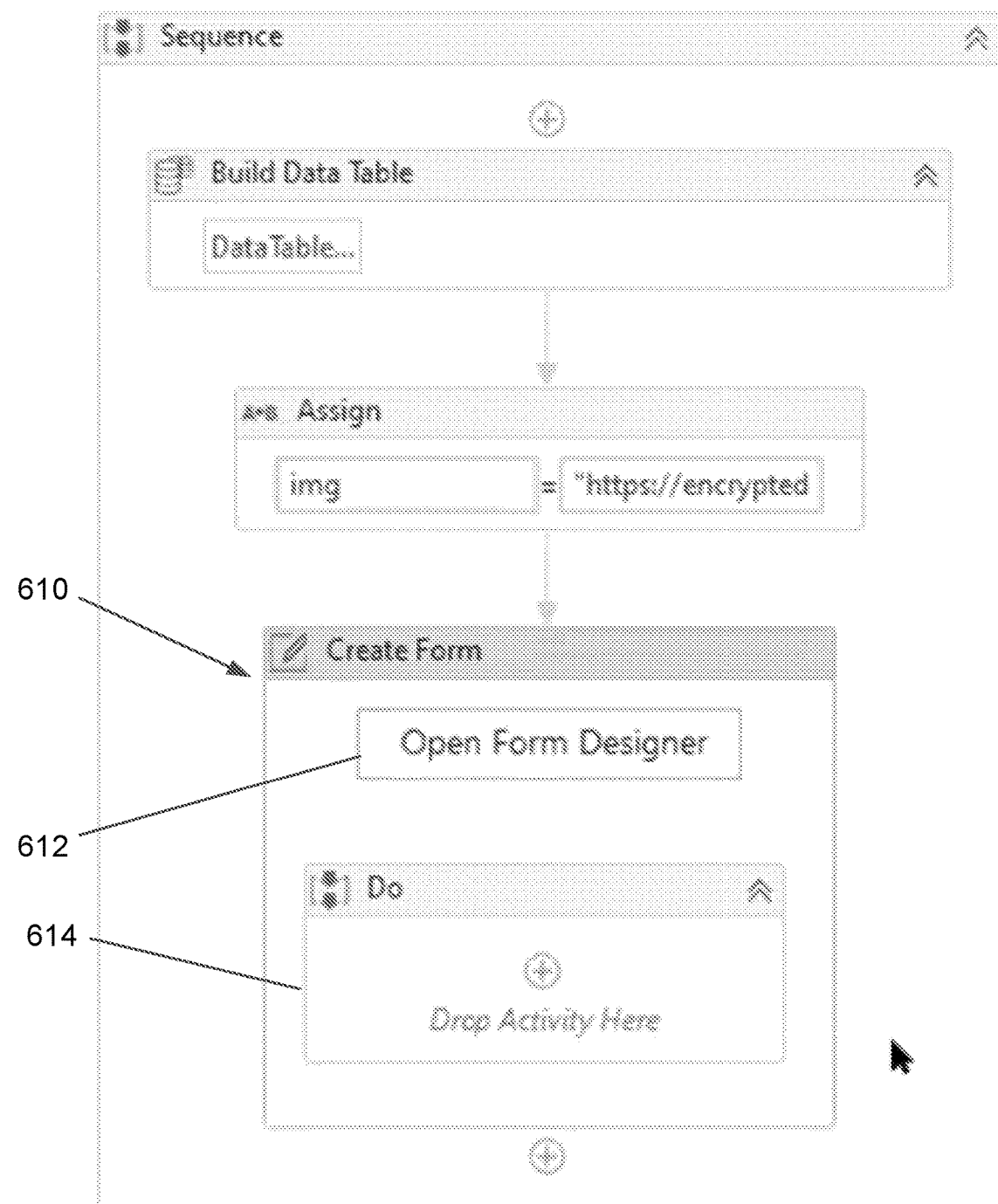
FIG. 6A is a partial screenshot illustrating an RPA workflow sequence from an RPA designer application, according to an embodiment of the present invention.
Figure 6B:
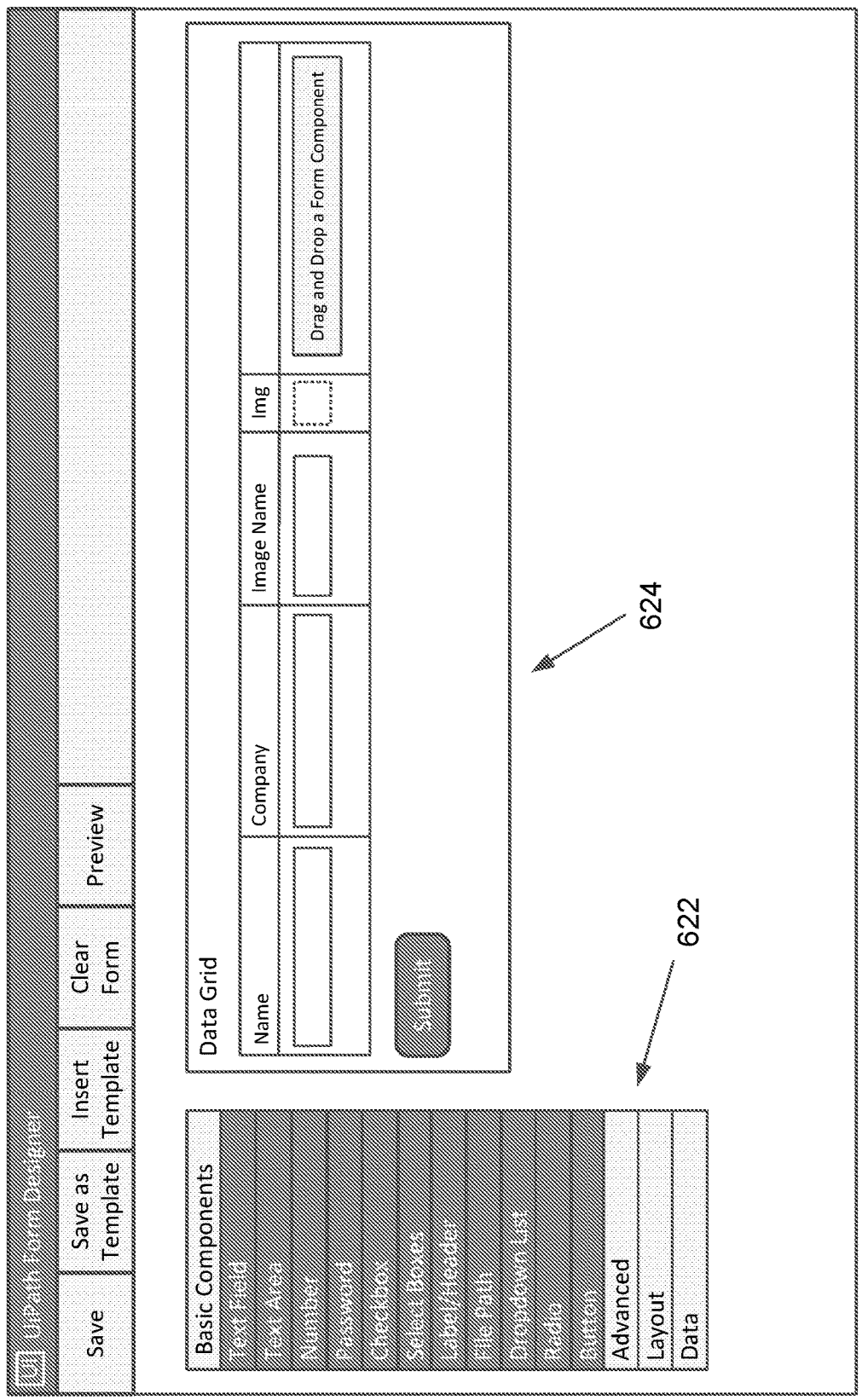
FIG. 6B illustrates a form designer, according to an embodiment of the present invention.

FIG. 6A is a partial screenshot illustrating an RPA workflow sequence 600 from an RPA designer application, according to an embodiment of the present invention. Sequence 600 includes a create form activity 610, which includes an "Open Form Designer" button 612 and a nested "Do" activity 614. A "Do" activity is an execution block in the RPA workflow. In the context of forms in some embodiments, there may be a Do block in the forms activity that is executed in the form. A refresh may occur when a button in the form is clicked, for example. Clicking button 612, as implied by the text thereof, opens a form designer, such as form designer 620 of FIG. 6B. Form designer 620 includes a side menu 622 with selectable components that can be dragged and dropped into a data grid 624. The user can design the form schema to have the desired functionality using side menu 622 and data grid 624, and then the completed form can be launched in its own window by an RPA robot executing sequence 600 in some embodiments. The RPA robot may execute the remainder of its workflow (e.g., Do activity 614) while the form is running. However, in certain embodiments, the RPA robot may interact with another form or interface that is not necessarily designed using the RPA designer application and/or launched by the RPA robot. For instance, in some embodiments, the RPA robot may interact with a web form in a web browser (e.g. Google Chrome®), fields in an application (e.g., Excel®, Salesforce®, etc.), or with any other suitable application without deviating from the scope of the invention.

Figure 6C:
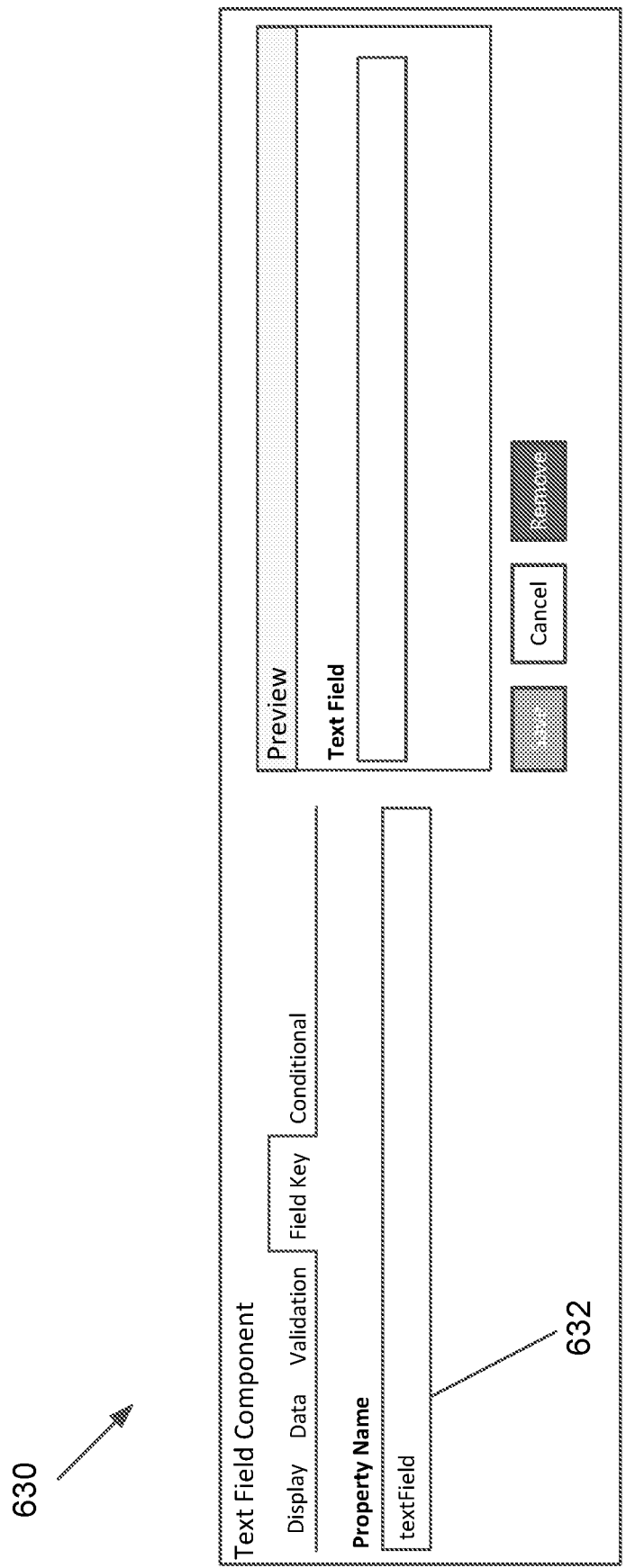
FIG. 6C is a partial screenshot illustrating a text field component interface, according to an embodiment of the present invention.
Figure 6D:
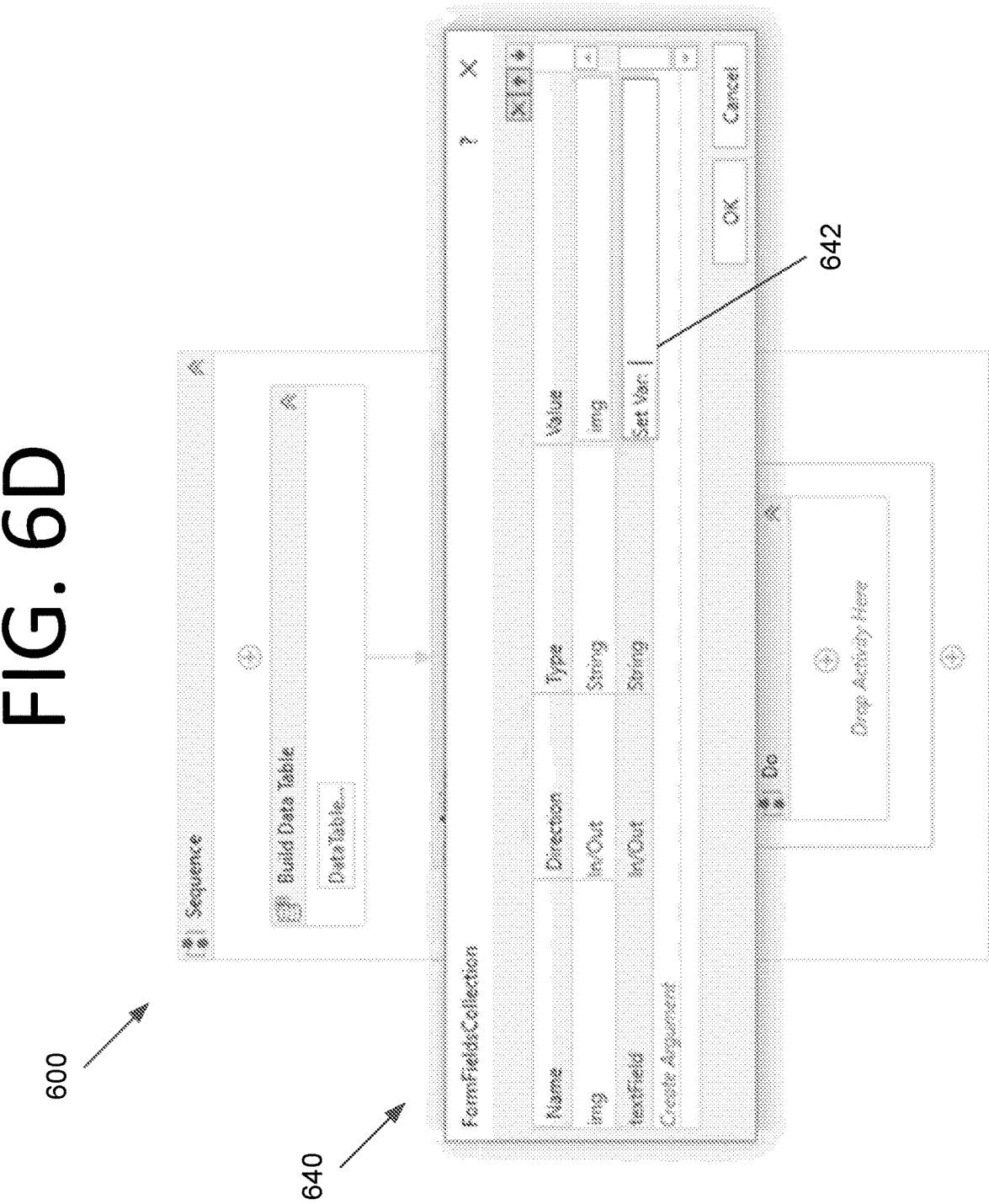
FIGS. 6D and 6E are partial screenshots illustrating a form fields interface over top of the RPA workflow sequence of FIG. 6A, according to an embodiment of the present invention.

FIG. 6C is a partial screenshot illustrating a text field component interface 630, according to an embodiment of the present invention. For a given text field component in the form, a property 632 can be defined that the user can bind back into the form process. The user can take this argument and bind it into the RPA workflow using a form fields collection window 640. See FIGS. 6D and 6E. Here, the RPA robot can take information in and out of the textField form field and choose a variable for binding using value field 642. Data can be fetched for web forms and then set to the value of a variable. In some embodiments, this may be similar to how arguments work when calling one RPA workflow from another RPA workflow. An argument may be bound to a variable and then passes between workflows, for example.

Figure 6E:
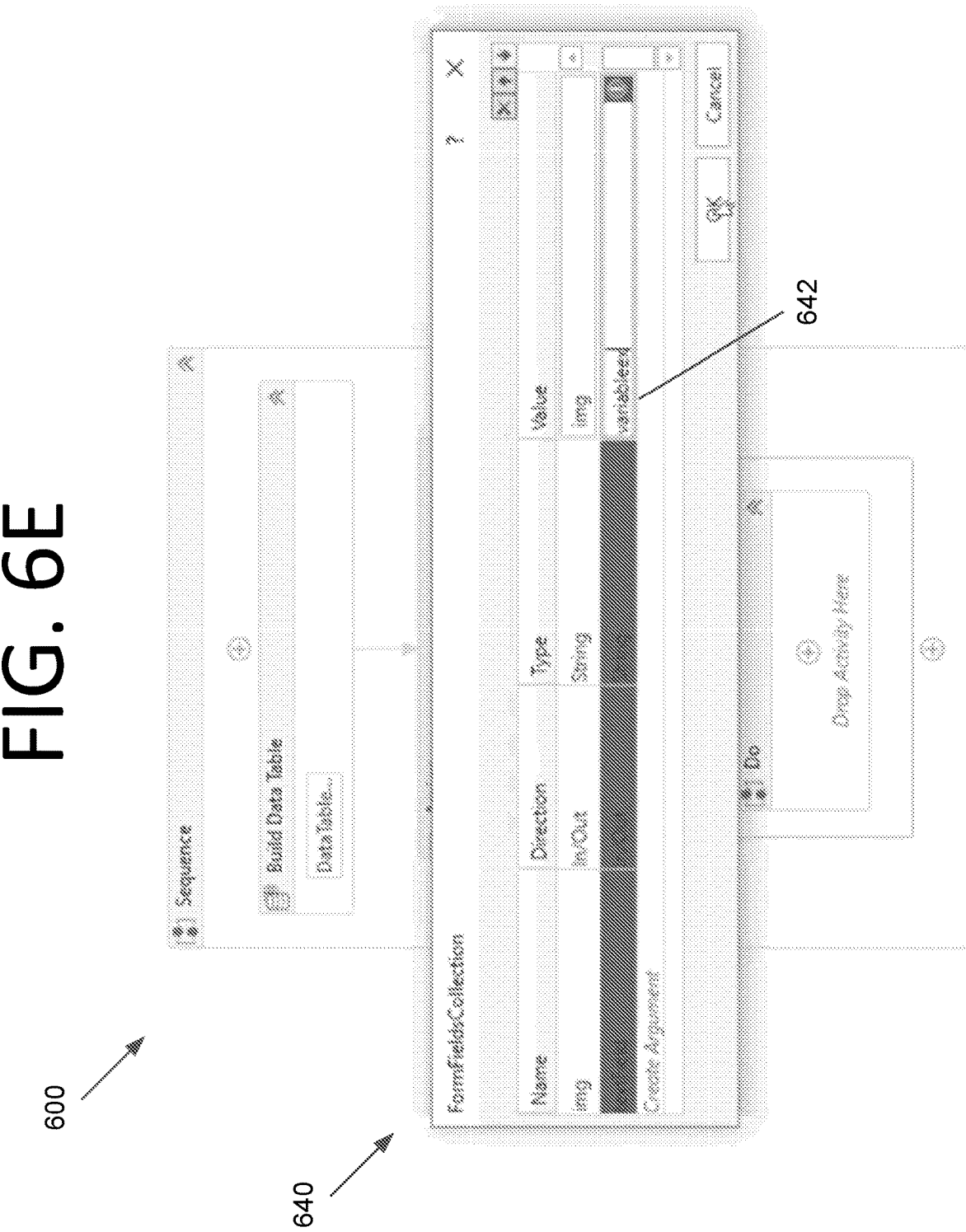
Figure 6E:
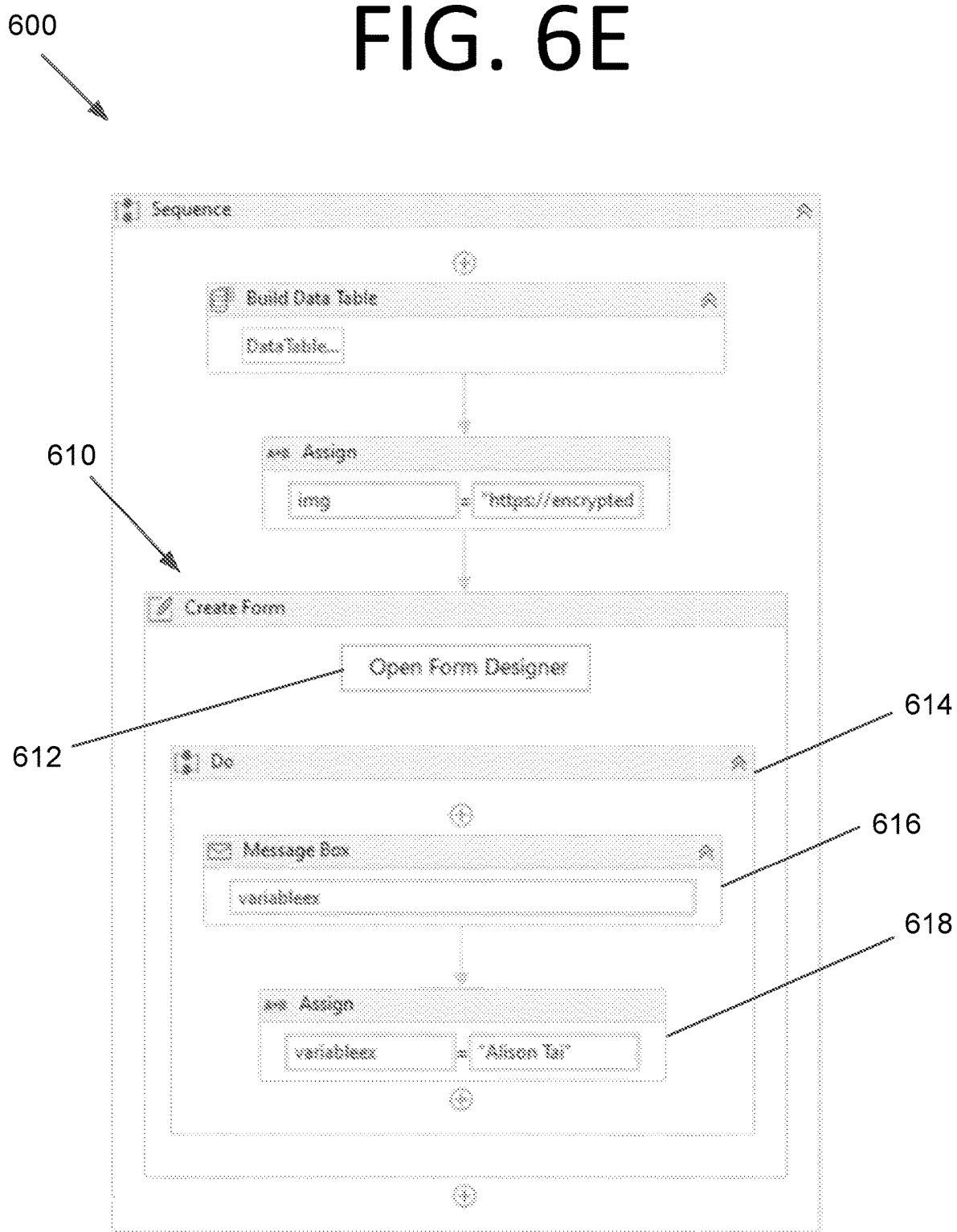

The user can now use the variable "variableex" in the RPA workflow. For instance, as shown in FIG. 6E, the user has added a message box activity 616 that shows the current value of "variableex" and an "Assign" activity 618 that sets the value of the variable "variableex" to "Alison Tai". In essence, the form and the RPA robot are accessing the same stored variable in memory, which the RPA robot manipulates.

Naturally, much more complex interactions are possible, including those that implement conditional logic, retrieve data from a database, perform a combination thereof, etc. In some embodiments, Do activity 614 may be configured to execute in parallel with the form when the form opens. However, Do activity 614 may be configured to execute when a button is pressed in the form, when an interrupt is generated, when a command is received, when a menu option is selected, when another application or process launches, or based on any other suitable execution trigger without deviating from the scope of the invention. For instance, the RPA robot could be configured to implement Do activity 614 when a lookup button in the form is clicked. The user can then continue interacting with the form elements that the robot is not touching while the RPA robot looks up the form data, for example. The user could also interact with form elements that the RPA robot will modify variables for, but this may overwrite the user's entries.

In some embodiments, in addition to or in lieu of one or more triggers, the "Do" loop can run while the form is running and periodically check for changes. For instance, Do activity 614 may be executed every second, every ten seconds, every minute, more frequently than these examples, less frequently than these examples, etc. In some embodiments, if a condition is met (e.g., a certain value is found in a certain field of the form), the RPA robot may run logic that may modify one or more bound variables. In certain embodiments, the RPA robot may be an unattended robot.

Figure 7A:
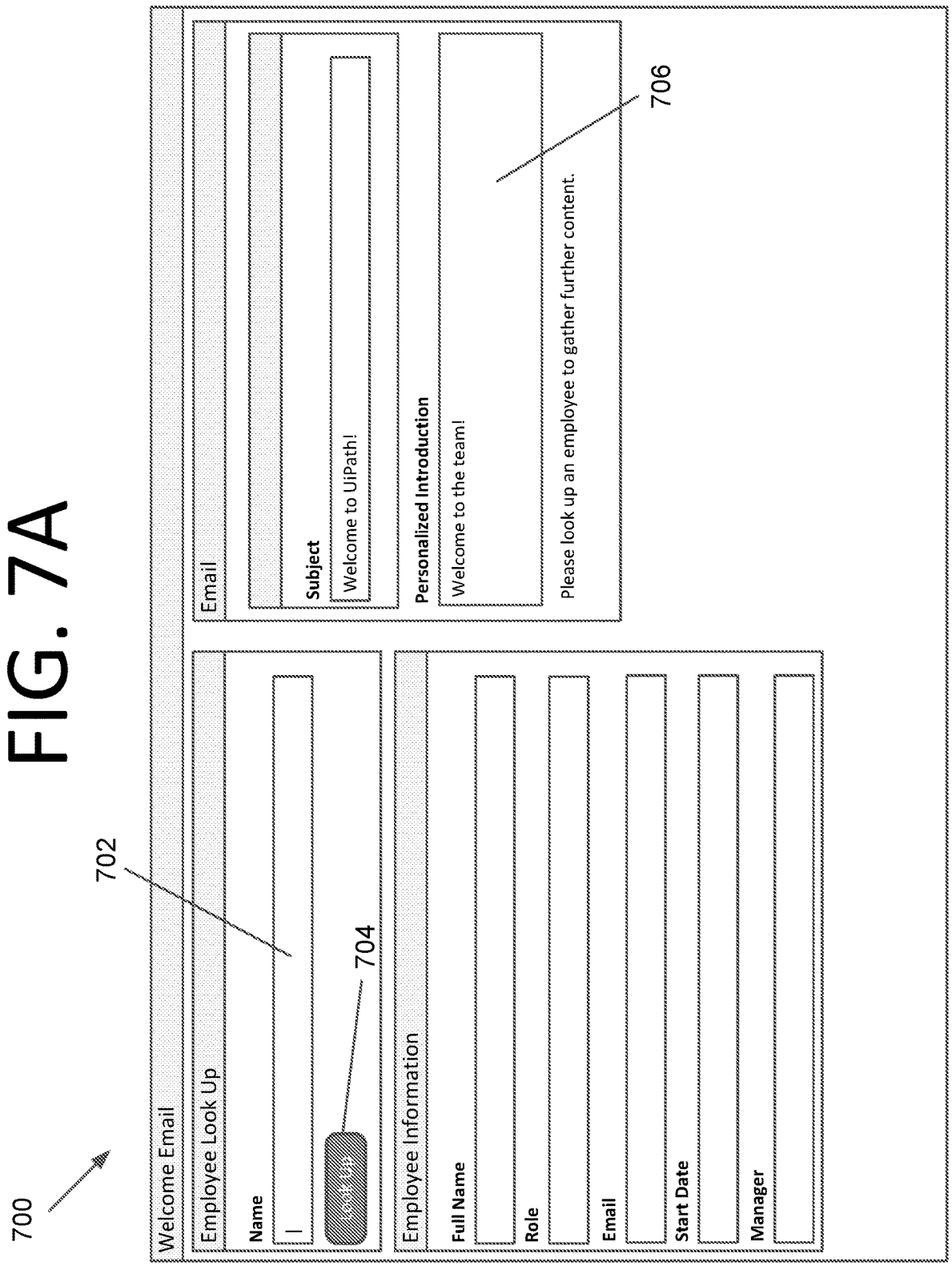

Consider the example of building an onboarding email, where a new employee has joined the company and an RPA developer would like the RPA robot to automatically complete some of the fields for the email to the new employee. FIG. 7A is a partial screenshot illustrating an example onboarding email form 700, according to an embodiment of the present invention. In some embodiments, form 700 may be built using form designer 620 of FIG. 6B, for example.

Figure 7B:
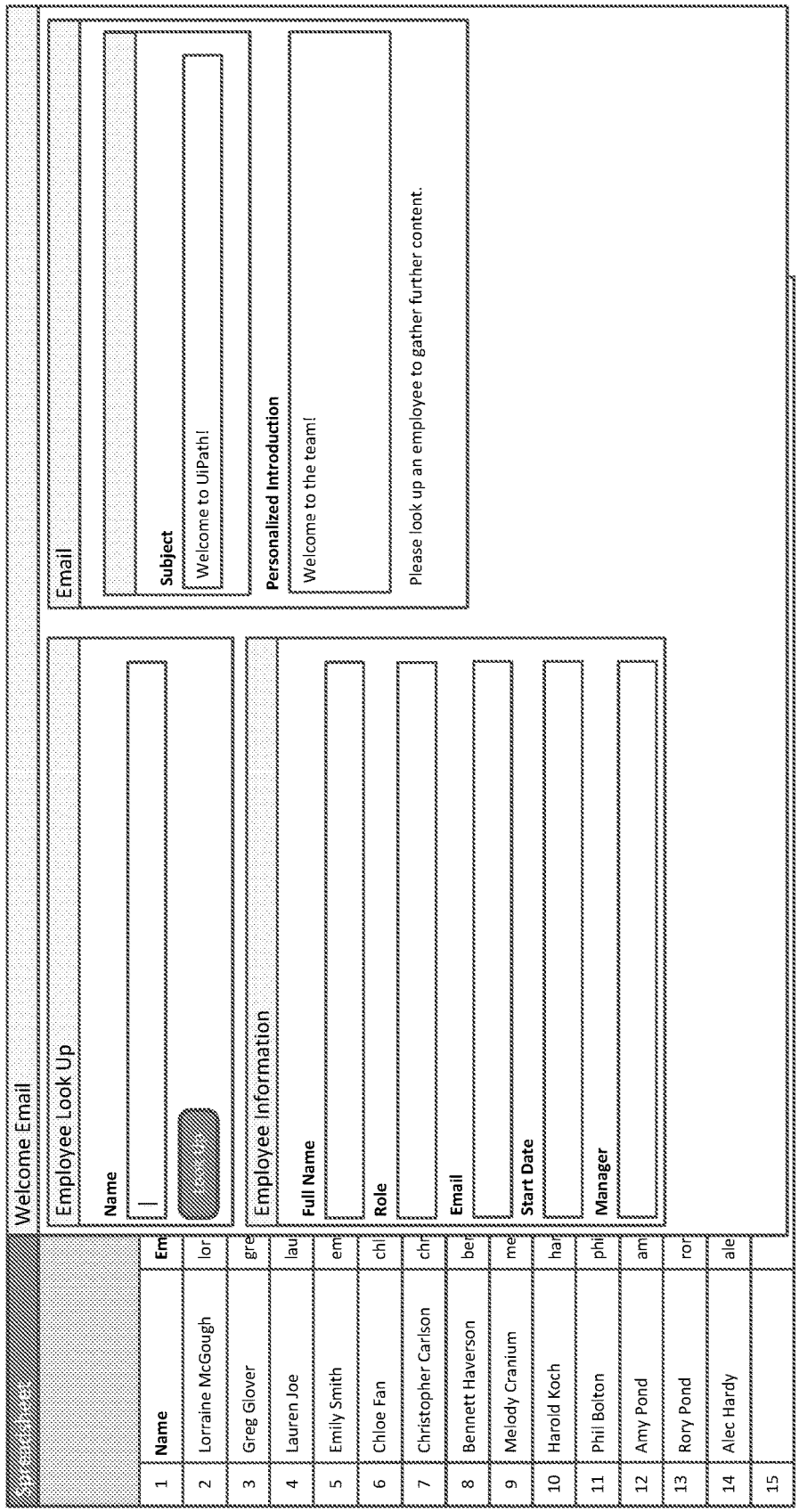

In this example, form 700 includes an employee name entry field 702, a Look Up button 704, and an email text field 706. When the user enters a name in name entry field 702 and presses Look Up button 704, in this embodiment, an RPA robot (not visible) opens Excel® spreadsheet 710, searches for the name "Greg Glover", and begins retrieving the table data associated with that employee. See FIG. 7B. While the RPA robot is performing the lookup, the user can enter text in email text field 706 or any other field. As such, an RPA robot may run in parallel with a form while a user works on the form. However, if the user enters text in the fields that the RPA robot will interact with, these fields may be overwritten.

Once the RPA robot has retrieved the employee information from Excel® spreadsheet 710, as the information for each field is retrieved, etc., the RPA robot changes the values of the respective bound variables for the fields to the values retrieved from Excel® spreadsheet 710. This causes the information to be displayed to the user in these fields in form 700. See FIG. 7C. In this embodiment, other options also appear at this point, such as text regarding still needing new hire documents, a payroll setup message, and some electable training options for the onboarding email.

In some embodiments, the form can be hosted on a web browser. For instance, a web form may be developed using a designer application and then launched as part of a process. In certain embodiments, the Form.io™ platform may be used, which is an API platform for web applications.

Figure 8A:
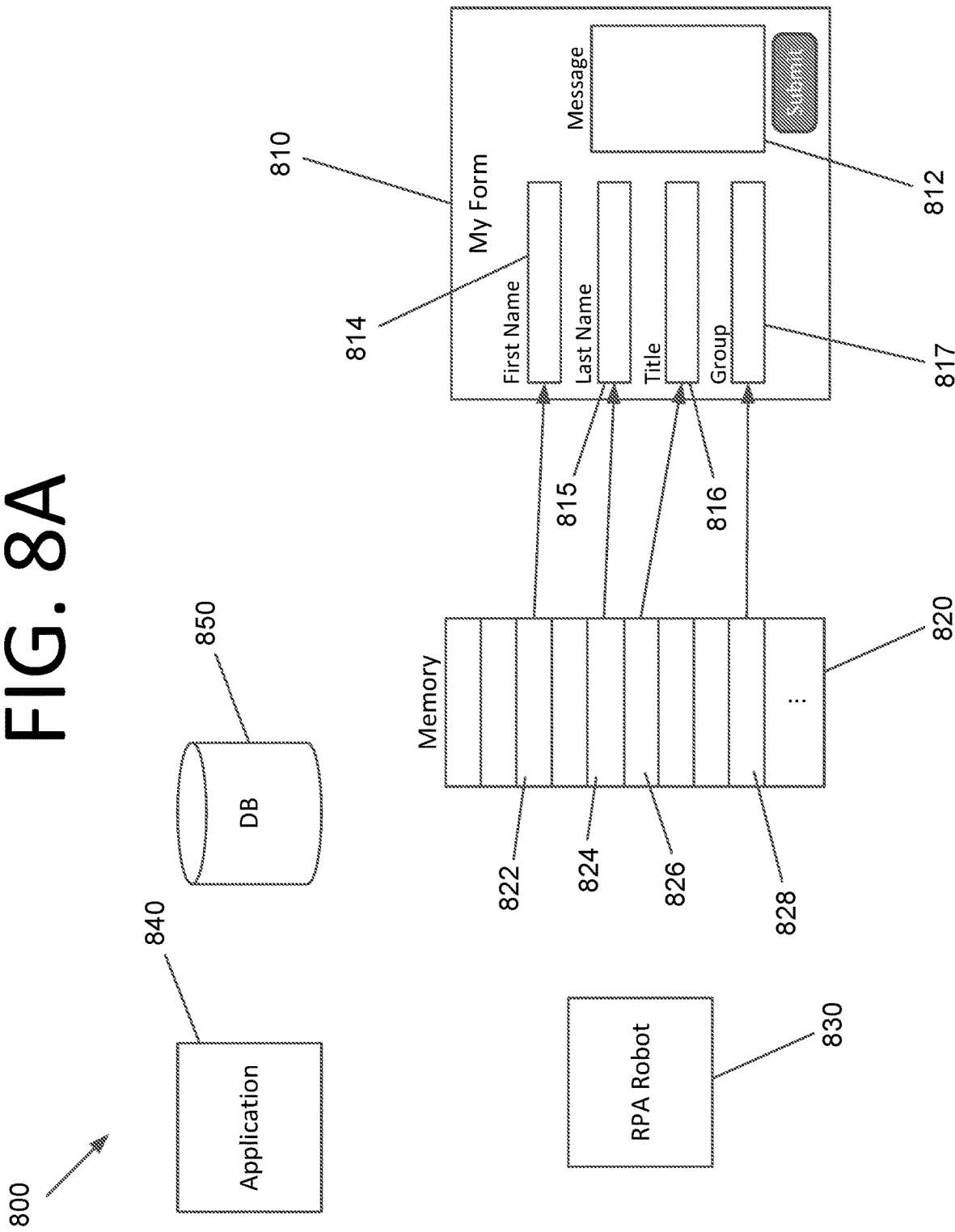
FIGS. 8A-C illustrate a system configured to perform shared variable binding and parallel execution of a process and robot workflow activities for RPA, according to an embodiment of the present invention.
Figure 8B:
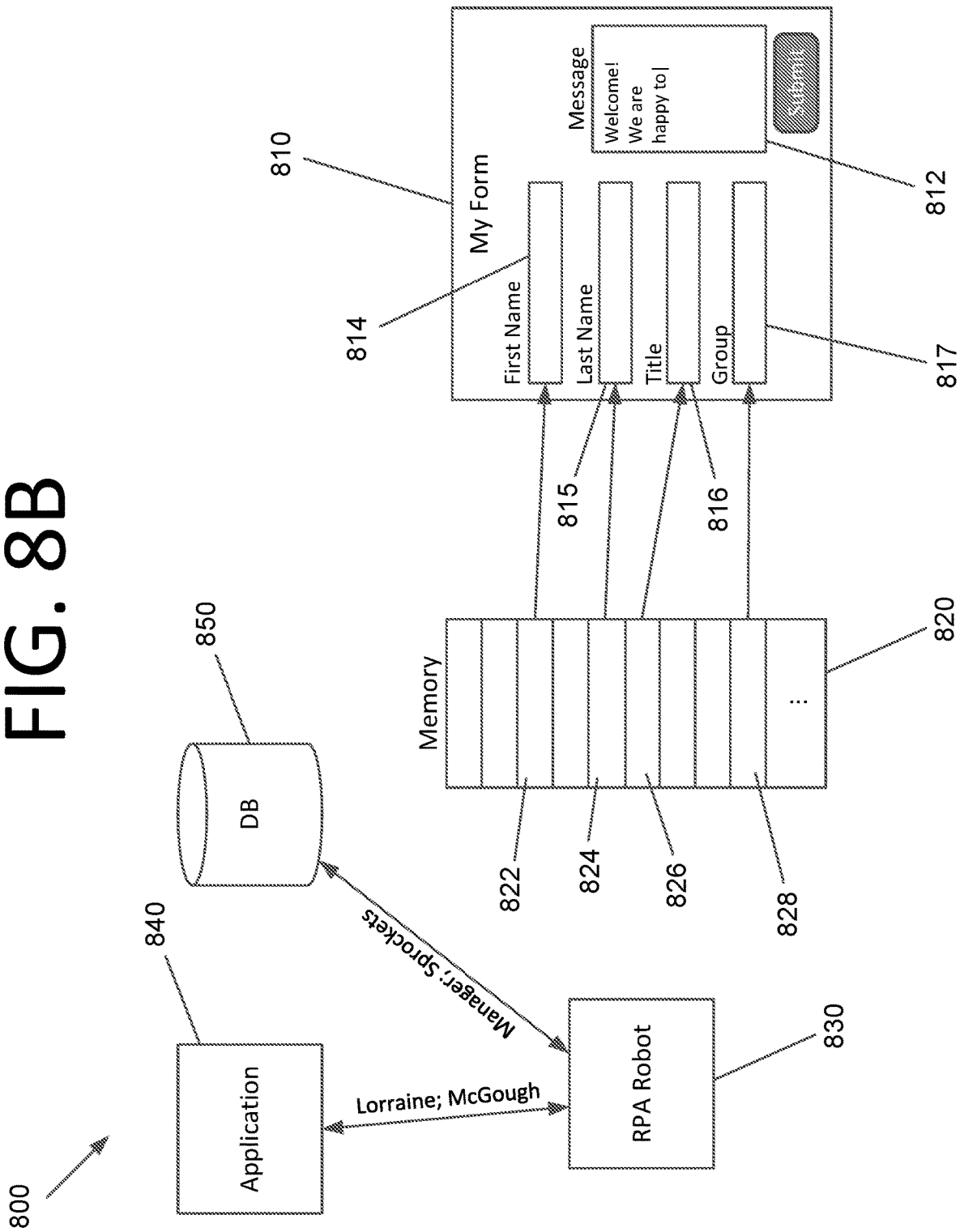
Figure 8C:
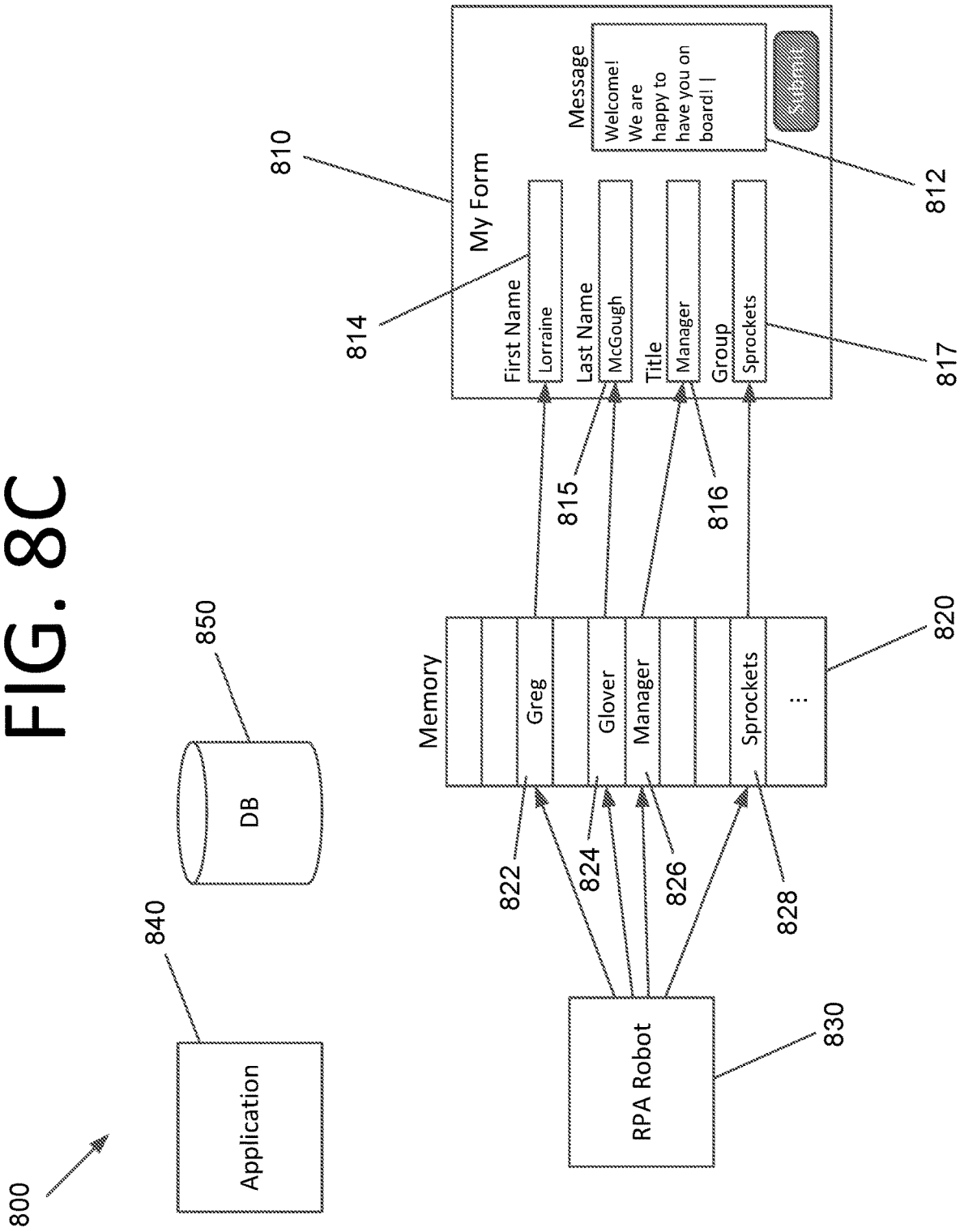

FIGS. 8A-C illustrate a system 800 configured to perform shared variable binding and parallel execution of a process and robot workflow activities for RPA, according to an embodiment of the present invention. System 800 includes a form 810, memory 820 (e.g., RAM, hard disk memory, processor cache, a combination thereof, etc.), and an RPA robot 830. System 800 also includes an application 840 that includes personnel names and a database 850 that includes job titles and groups. System 800 is provided by way of example only, and any suitable number and/or type of forms, fields, memory configurations, RPA robots, applications, and/or databases may be used without deviating from the scope of the invention.

Form 810 has a message text area 812 and fields 814, 815, 816, 817. Each of fields 814, 815, 816, 817 has an associated variable stored in blocks 822, 824, 826, 828, respectively, in memory 820. While single blocks 822, 824, 826, 828 are shown, in some embodiments, multiple blocks may be used for one or more of the variables, potentially linked by pointers. Fields 814, 815, 816, 817 may be populated with the respective variable values by storing a memory pointer and loading the values for the variables from blocks 822, 824, 826, 828, respectively. In some embodiments, form 810 may be refreshed periodically, based on a trigger, and/or manually.

Referring to FIG. 8A, the values for fields 814, 815, 816, 817 are initially empty. However, upon execution of RPA robot 830, which executes in parallel with form 810, RPA robot 830 requests and receives the first and last name from application 840 and the title and group from database 850. See FIG. 8B. While RPA robot 830 is retrieving this information, a user is able to interact with form 810, entering text into message text area 810.

After RPA robot 830 retrieves the form information, RPA robot 830 modifies the bound variables stored in blocks 822, 824, 826, 828. See FIG. 8C. Form 830 then accesses these variable values and updates fields 814, 815, 816, 817 with the respective values from blocks 822, 824, 826, 828. The user may then submit the form, edit fields 814, 815, 816, 817, etc.

Figure 9:
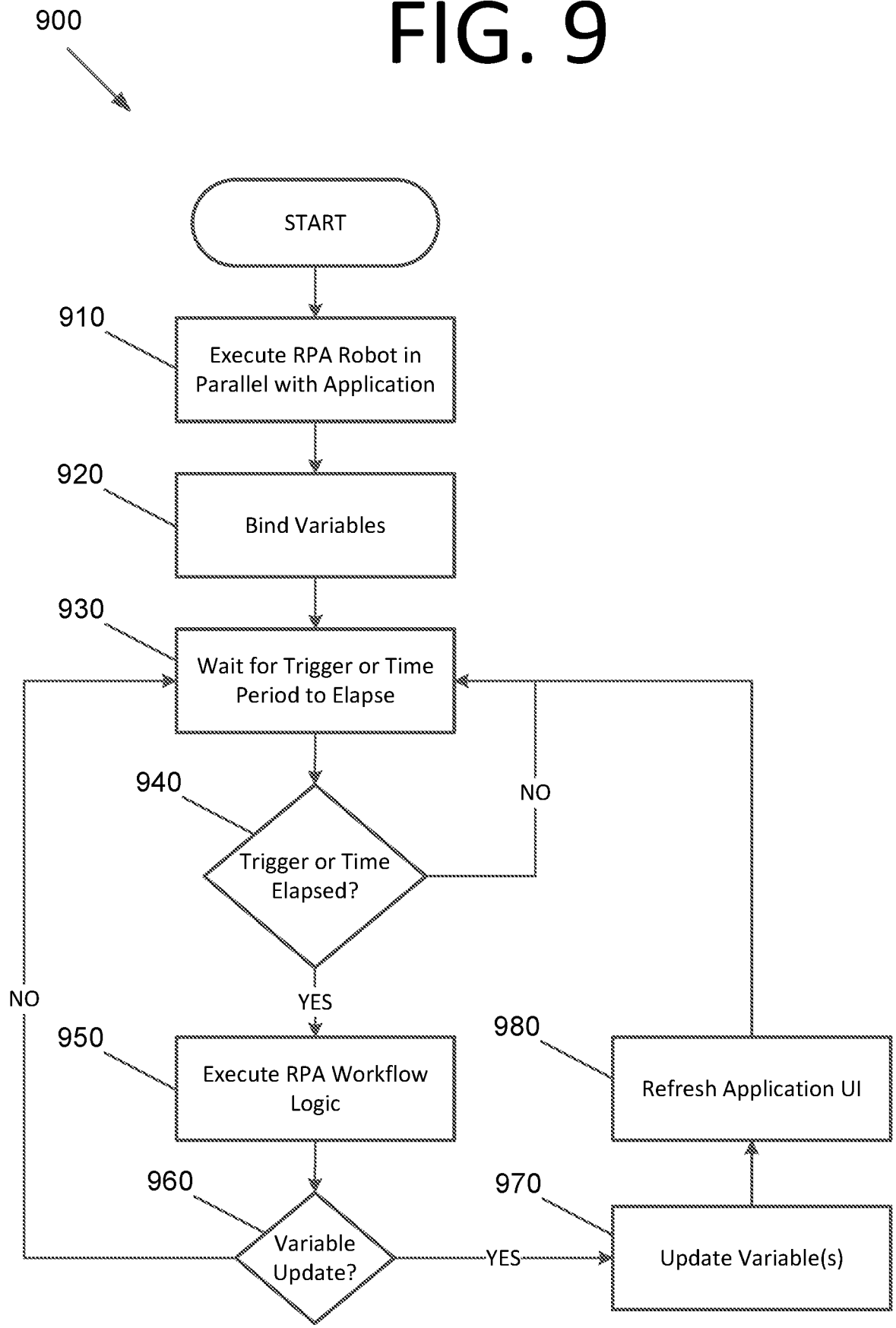
FIG. 9 is a flowchart illustrating a process for performing shared variable binding and parallel execution of a process and robot workflow activities for RPA, according to an embodiment of the present invention.

FIG. 9 is a flowchart illustrating a process 900 for performing shared variable binding and parallel execution of a process and robot workflow activities for RPA, according to an embodiment of the present invention. The process begins with executing an RPA robot that is configured to access and modify one or more bound variables associated with one or more UI elements of an application in parallel with the application at 910.

The one or more bound variables in one or more activities of the workflow of the RPA robot are bound at 920. This enables the RPA robot to locate the bound variables in memory. In some embodiments, the binding of the one or more variables in the one or more activities of the workflow of the RPA robot includes configuring the RPA robot with respective pointers to the bound variables in memory, calling an API of the application, by the RPA robot, that provides memory information for the one or more bound variables, or a combination thereof. In some embodiments, the application is or includes a form generated via an RPA designer application and the RPA robot is configured to launch the form based on an activity in a workflow of the RPA robot. In some embodiments, the one or more bound variables are associated with and displayed in a text field, a text area, or a combination thereof, in the application. The RPA robot then waits for a trigger or time period since a last refresh to elapse at 930. In some embodiments, the trigger includes a button press event, an interrupt, a command, a menu option selection event, a process launching event, or a combination thereof.

When the trigger is received or after the period of time since the last refresh elapses at 940, the RPA robot executes its RPA workflow logic associated with the variable(s) at 950. In some embodiments, the RPA robot and the application are configured so a user can interact with the application while the RPA robot is performing the logic for assessing and modifying the one or more bound variables. When the executed logic indicates that one or more variable updates should occur at 960, the appropriate bound variable(s) in the memory are modified based on the executed logic at 970. The application UI is then updated at 980, reflecting the value(s) of the updated bound variable(s). In certain embodiments, the refresh may be periodic or continuous and not directly linked to the execution of the RPA workflow logic.

The process steps performed in FIG. 9 may be performed by a computer program, encoding instructions for the processor(s) to perform at least part of the process(es) described in FIG. 9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for performing shared variable binding and parallel execution of a process and robot workflow activities for robotic process automation (RPA) embodied on a non-transitory computer-readable medium, the computer program configured to cause at least one processor to:

execute an RPA robot that is configured to access and modify one or more bound variables associated with one or more user interface (UI) elements of an application in parallel with the application, the one or more bound variables located in memory;

execute logic of a workflow of the RPA robot; and modify at least one of the one or more bound variables in the memory based on the executed logic, thereby updating values displayed in the one or more UI elements of the application.

2. The computer program of claim 1, wherein the application is or comprises a form generated via an RPA designer application and the RPA robot is configured to launch the form based on an activity in a workflow of the RPA robot.

3. The computer program of claim 1, wherein the RPA robot is configured to access and modify the one or more bound variables based on a trigger.

4. The computer program of claim 3, wherein the trigger comprises a button press event, an interrupt, a command, a menu option selection event, a process launching event, or a combination thereof.

5. The computer program of claim 1, wherein the RPA robot and the application are configured so a user can interact with the application while the RPA robot is performing the logic for assessing and modifying the one or more bound variables.

6. The computer program of claim 1, wherein the computer program is further configured to cause the at least one processor to:

refresh a UI of the application after the RPA robot modifies the one or more bound variables.

7. The computer program of claim 1, wherein the computer program is further configured to cause the at least one processor to:

periodically or continuously refresh a UI of the application.

8. The computer program of claim 1, wherein the one or more bound variables are associated with and displayed in a text field, a text area, or a combination thereof, in the application.

9. The computer program of claim 1, wherein the computer program is further configured to cause the at least one processor to:

bind the one or more bound variables in one or more activities of the workflow of the RPA robot, thereby enabling the RPA robot to locate the bound variables in memory.

10. The computer program of claim 9, wherein the binding of the one or more variables in the one or more activities of the workflow of the RPA robot comprises configuring the RPA robot with respective pointers to the bound variables in memory, calling an application programming interface (API) of the application, by the RPA robot, that provides memory information for the one or more bound variables, or a combination thereof.

11. A computer-implemented method for performing shared variable binding and parallel execution of a process and robot workflow activities for robotic process automation (RPA), comprising:

executing, by a computing system, an RPA robot that is configured to access and modify one or more bound variables associated with one or more user interface (UI) elements of an application in parallel with the application, the one or more bound variables located in memory;

executing logic of a workflow of the RPA robot, by the computing system, based on a trigger received or after a period of time since a last refresh elapses;

modifying at least one of the one or more bound variables in the memory based on an indication from the executed logic that one or more variable updates should occur, by the computing system; and refreshing a UI of the application after the RPA robot modifies the one or more bound variables, by the computing system.

12. The computer-implemented method of claim 11, wherein the application is or comprises a form generated via an RPA designer application and the RPA robot is configured to launch the form based on an activity in a workflow of the RPA robot.

13. The computer-implemented method of claim 11, wherein the trigger comprises a button press event, an interrupt, a command, a menu option selection event, a process launching event, or a combination thereof.

14. The computer-implemented method of claim 11, wherein the RPA robot and the application are configured so a user can interact with the application while the RPA robot is performing the logic for assessing and modifying the one or more bound variables.

15. The computer-implemented method of claim 11, wherein the one or more bound variables are associated with and displayed in a text field, a text area, or a combination thereof, in the application.

16. The computer-implemented method of claim 11, further comprising:

binding, by the computing system, the one or more bound variables in one or more activities of the workflow of the RPA robot, thereby enabling the RPA robot to locate the bound variables in memory.

17. The computer-implemented method of claim 16, wherein the binding of the one or more variables in the one or more activities of the workflow of the RPA robot comprises configuring the RPA robot with respective pointers to the bound variables in memory, calling an application programming interface (API) of the application, by the RPA robot, that provides memory information for the one or more bound variables, or a combination thereof.

18. A computer-implemented method for performing shared variable binding and parallel execution of a process and robot workflow activities for robotic process automation (RPA), comprising:

executing, by a computing system, an RPA robot that is configured to access and modify one or more bound variables associated with one or more user interface (UI) elements of an application in parallel with the application, the one or more bound variables located in memory;

binding, by the computing system, the one or more bound variables in one or activities of the workflow of the RPA robot, thereby enabling the RPA robot to locate the bound variables in memory;

executing logic of a workflow of the RPA robot, by the computing system, based on a trigger received or after a period of time since a last refresh elapses; and modifying at least one of the one or more bound variables in the memory based on an indication from the executed logic that one or more variable updates should occur, by the computing system, wherein the binding of the one or more variables in the one or more activities of the workflow of the RPA robot comprises configuring the RPA robot with respective pointers to the bound variables in memory, calling an application programming interface (API) of the application, by the RPA robot, that provides memory information for the one or more bound variables, or a combination thereof.

19. The computer-implemented method of claim 18, further comprising:

refreshing a UI of the application after the RPA robot modifies the one or more bound variables, by the computing system.

20. The computer-implemented method of claim 18, wherein the trigger comprises a button press event, an interrupt, a command, a menu option selection event, a process launching event, or a combination thereof.

* * * * *